March 1, 1949.    G. A. UNGAR    2,462,924
GEAR TOOTH PROFILE

Filed March 1, 1944    6 Sheets-Sheet 1

INVENTOR.
GUSTAVE A. UNGAR
BY
Lackenbach & Hirschman
ATTORNEYS

March 1, 1949. G. A. UNGAR 2,462,924
GEAR TOOTH PROFILE
Filed March 1, 1944 6 Sheets-Sheet 2

INVENTOR.
GUSTAVE A. UNGAR
BY
Lackenbach & Hirschman
ATTORNEYS

March 1, 1949.   G. A. UNGAR   2,462,924
GEAR TOOTH PROFILE

Filed March 1, 1944   6 Sheets-Sheet 3

INVENTOR.
GUSTAVE A. UNGAR
BY
ATTORNEYS

March 1, 1949.  G. A. UNGAR  2,462,924
GEAR TOOTH PROFILE

Filed March 1, 1944  6 Sheets-Sheet 4

INVENTOR.
GUSTAVE A. UNGAR
BY
*Lackenbach + Hirschman*
ATTORNEYS

March 1, 1949.  G. A. UNGAR  2,462,924
GEAR TOOTH PROFILE

Filed March 1, 1944  6 Sheets-Sheet 5

INVENTOR.
GUSTAVE A. UNGAR
BY
ATTORNEYS

Patented Mar. 1, 1949

2,462,924

UNITED STATES PATENT OFFICE 2,462,924

GEAR TOOTH PROFILE

Gustave A. Ungar, New Rochelle, N. Y., assignor to Equi-Flow, Inc., New York, N. Y., a corporation of New York Application March 1, 1944, Serial No. 524,536

13 Claims. (Cl. 74—466)

The invention relates to a gear tooth profile and to rotors for an external-tooth type of gear pump for fluids and gases.

More particularly, the invention relates to a novel type of profile for the individual teeth or lobes of a rotor which is cooperatively engaged by another rotor having similar external teeth or lobes, whereby one of the rotors is driven by the other at the same pitch line velocity.

The pumping of liquids by such cooperating rotors, as in a gear pump, with high suction lift, or under a high vacuum such as is encountered in the operation of gear pumps at high altitudes, as in an airplane, presents certain difficulties and limitations to a satisfactory volumetrical performance of the mechanism, which difficulties and limitations the present invention is designed to overcome.

The important factor contributing in great measure to the reduction of the volumetrical performance of a gear pump at a high vacuum is a specific design feature of pumps which prevents the complete discharge of all of the liquid containtained at the discharge side of the pump by reason of the presence of a residual or clearance space in the pump designs of the prior art. All liquids for the pumping of which rotary gears are conventionally provided, contain a certain quantity of entrained or dissolved air or gas which is normally carried back to the suction side of the pump, where the air or gas expands to the prevailing suction pressure, thereby greatly reducing the space available for the incoming liquid which is to be passed through the pump.

One of the most sought-after objects of prior designers of gear pumps has been, therefore, the provision of the smallest possible clearance space, i. e., residual or re-expansion pump volume, so as to overcome, as far as possible, this specific factor contributing to the reduction of the volumetrical performance of the pump. My novel gear pump design, primarily by reason of the new profile which is imparted, in accordance with my invention, to the teeth or lobes of the gear rotors, is effective to overcome this definite cause of the reduction in volumetrical performance of the pump.

In its broadest aspects, in my novel tooth profiles for the cooperating rotors of a gear pump, three specific features contributing in great measure to the overcoming of the difficulties and limitations to satisfactory volumetrical performance, are involved. These features, not listed in the order of their importance, as all contribute to the increased efficiency of the rotor performance of the pump, are as follows:

As hereinabove indicated, my novel construction insures the complete discharge of the fluid being pumped from between the meshing or mating rotors at the discharge side of the rotating elements, so that no portion of such fluid will be carried back by the rotating elements through the mating zone to the intake side. This feature is particularly evident in the elimination of volumetrical losses when the pump is operating at a high vacuum.

My novel construction of gear pump, embodying, in the design of the teeth or lobes, my new tooth profile, enables the driving of one rotor through another and cooperation rotor at the same pitch line velocities without the use of separate timing gears. This feature, i. e. the elimination of the necessity of using separate timing gears for the pump rotors, is of particular importance in instalations, for instance, in aircraft where complicated mechanism, both from the point of view of space availability and likelihood of the necessity of frequent repairs, is to be avoided.

My novel rotor structures, with the tooth profiles configured in accordance with my invention, provide a continuous sealing contact between the cooperating rotors of the pump in the meshing or mating zones of such rotors.

The three main features of my invention, as hereinabove indicated, are attained by a certain configuration imparted to the tooth profiles of the cooperating gear rotors which tooth profiles have certain definite outlines in their tip or land portions and their base or root.

In accordance with my invention, the individual tooth profile consists of a portion located near the pitch diameter which has a curvature suitable to transmit motion between the rotors at the same angular velocity of the driving and driven rotor. Such curvature may be of an involute or a cycloidal nature, with the remaining portion of the profile of the tooth of such configuration as to permit rotation without interference and with the closest possible approach of contact of the tooth tips and bases along a definite portion of the tooth profile when the two rotors are not in driving engagement.

By providing this specific configuration to the tooth profiles, the profiles of two meshing or mating gears will always be in engagement, which will be either an involute driving engagement or a rolling sealing engagement.

My novel tooth profile is further characterized by the provision of a tip or land for the tooth or lobe which is completely rounded, and therefore has no sharp edges, as is the case in conventional gear teeth. The gear tooth tip or land, in accordance with my invention, is configured with a circular tip portion. This circular tip portion consists of a circular section representing the gear outside diameter and is connected by two convex curved sections to the involute driving portions of the tooth. The curved connecting sections are joined tangentially to the involute driving portions and to the circular sections of the tooth tip or land at each end thereof.

In my novel configuration of tooth profile, the root or base portion consists of two sections, the first of which is a circular portion having a diameter equal to the inside or root diameter of the rotor and having an angular length of certain limits, more specifically described hereinafter, and a second section which is, in turn, constituted of two concave portions, each of which is a curve obtained by rolling the mating convex connecting portions of the tooth or lobe tip of the mating rotor upon it at the same pitch line velocity. The obtaining of these curves in this manner provides contact or sealing at every point of the entire extent of rolling. Again, the connecting portions just described are joined tangentially to the circular and involute portions of the tooth at each end.

Specific forms of my novel tooth profile will be described hereinafter, and are illustrated in the accompanying drawings. The preferred form of the concave curves forming a part of the root portion of the tooth or lobe is a concave curve identical in shape and length with the convex connecting curve of the tooth tip when superimposed upon it. This preferred form of the concave curve is selected because by its use, there results a momentary sealing contact which takes place at the instant when circular contact in the meshing of the rotors ends and involute engagements of the tooth profile begins, and vice versa.

Succinctly stated, my invention consists in the provision of a rotor for an external-tooth type gear pump in which the profiles of the individual teeth of the rotor are constituted of driving portions on each side of the pitch line, or involute outline, a tip of rounded configuration comprising a circular section of a diameter equal to the diameter of the rotor and two convex curved sections, and a root or base for the tooth comprising a circular portion of a diameter equal to the root diameter of the rotor, and two concave portions, all sections of the tooth surface being tangentially connected to adjacent circular and involute sections.

While I have indicated hereinabove certain definite advantages of my new tooth profile configuration, it will be evident to those skilled in the art that there are other advantages which result from the use of the new tooth profile. Among these may be briefly mentioned the possibility of using fewer and deeper teeth with greater volumetric utilization of the rotor diameter; no trapping, in which case sections, for instance of a solid helical rotor, or the laminations of a laminated gear rotor structure, as hereinafter described, are advanced or displaced; the elimination of pulsation, i. e. uniform rate of flow by the same helical advancing of solid helical rotors or helical displacement of laminated sections of a rotor; the possibility of increasing the pump speed beyond the limits normally set by available atmospheric pressure; the reduction, to a minimum, of the leakage area; and generally, obtaining these results without mechanical complications and in the simplest manner.

Other advantages and the elimination of difficulties and limitations to a satisfactory volumetric performance will occur to those skilled in the art from the following description of specific embodiments of my invention and the illustration, in the drawings, of specific applications thereof in conventional gear pumps.

In certain of the accompanying drawings, I illustrate schematically, different positions of engagement of the tooth profiles of two meshing gears when such tooth profiles are configured in accordance with my invention. In other figures of the drawings, I show the practical application of my novel tooth profile in rotary gear pumps of the axial flow type, both laminated and solid, a solid helical gear pump, and a spur type gear pump.

In the drawings, Figs. 1 to 4, inclusive, illustrate the tooth profiles of the meshing gears with the involute driving portions thereof in four different positions of engagement; Fig. 11 is a section on the line 12—12 of Fig. 13, showing a pump having solid helical gears whose teeth are configured in accordance with the invention.

Referring more particularly to the drawings, in which similar reference characters identify similar parts in the several views, in Figs. 1 to 4, inclusive, are illustrated four different positions of engagement of the involute driving portions of two teeth of the meshing set of driven and driving gears. In such figures, the left hand tooth is that of the driven gear, and the right hand tooth is that of the driving gear. The line of action of the teeth or lobes of the gears is identified by the reference character $a$. When the right hand or driving gear rotates in the direction of the arrows in Figs. 1 to 4, the involute driving portions of the tooth profiles are in engagement.

The tooth tips of each of the two teeth of the respective gears, include in their extent the circular portion encompassed by the reference characters $+1'$, $0$, and $1$ of the driving gear, and $4'$, $5'$, $6'$ of the driven gear, and which circular portion, in the preferred embodiment illustrated in these figures, is shown by the portion $b$. Such circular portion is effective to improve the liquid seal in the pumping chamber in a conventional type of gear pump and with laminated gears as hereinafter described, permits the circumferential displacement of the adjacent laminations of the gear. It will, of course, be understood that this displacement must be less in extent than the circular tooth tip portions +I, 0, I or 4', 5', 6'.

The two mating gear profiles will always be in engagement, which engagement will be either of an involute driving nature, or of a rolling sealing nature.

The tooth tip of each of the mating gear teeth in involute driving engagement, consists of the circular portion b representing the gear outside diameter and of two adjacent portions c and d which are convex curves. The convex curved portions c and d are joined tangentially to the circular tooth tip portion b and at their opposite ends are joined tangentially to the involute portions e and f. Such involute portions of the profiles of the individual teeth extend below and above the pitch line P. L. of each tooth.

The root portion of the tooth consists of a circular portion i and j having a diameter equal to the inside or root diameter of the rotor, and having an angular length beginning at one end of its sealing engagement with one end of the circular tip portion of the mating rotor, and continuing through to the other ends of both circular portions reached simultaneously when both rotors revolve at the same pitch line velocities. The root portion of the tooth includes also two concave portions g and h, each of which is a curve obtained by rolling its mating convex connecting portions of the tooth tip of the mating rotor upon it at the same pitch line velocity. In this manner, contact or sealing at every point of the entire extent of rolling is secured. These two connecting concave portions are likewise joined tangentially to the circular and involute portions of the tooth profile at each end.

While in the above description of the showing in Figs. 1 to 4, I have specified and identified the four different positions of engagement of the involute driving portions of two teeth of the meshing set of driven and driving gears, substantially the same showing would illustrate the corresponding different positions of engagement of the cycloidal driving portions of two teeth having cycloidal profiles with the exception that the figures illustrating such positions of engagement would show a circular line of action instead of a straight line, as shown in Figs. 1 to 4 and, for that matter, in Figs. 5 and 6 and Figs. 14 and 15. It is not deemed necessary to separately illustrate these alternative tooth profiles, with respect to their driving engagement.

Figures 5, 7:
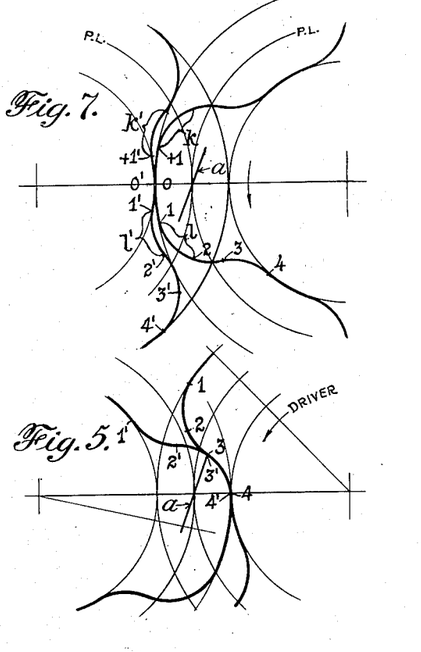
Figs. 5 to 7, inclusive, illustrate a modification of the tooth profile, showing limit proportions of the rolling profiles when in involute contact.
Figure 6:
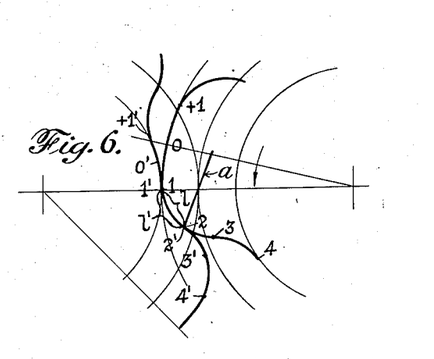

A preferred form of my tooth profile is illustrated in Figs. 5 to 7, inclusive, wherein the root portion of the tooth consists of concave curves k' and l' tangential at their inner ends to the root or bottom diameter of the rotor which curves are complements of the circular tooth tip when rolling one upon the other at the same pitch line velocity, so as to provide a contact or sealing point along the entire extent of the rolling engagement. In this modified form, also, the convex curve k and curve l are tangentially joined to the involute driving portions. In this instance also, the preferred form for the concave portions k' and l' of the root of the tooth are curves identical with the convex connecting curves k and l of the tip when superimposed upon it. This identity of such curved portions results in an extended momentary sealing contact which takes place when the involute engagement of one involute flank ends and begins at the next involute flank.

Figure 1:
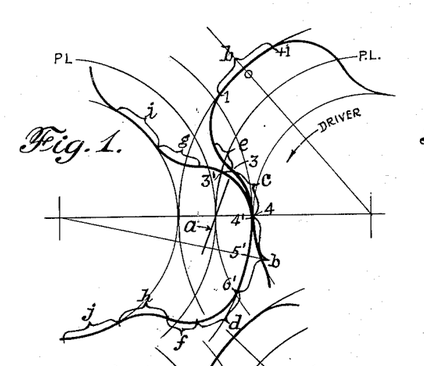
Figure 4:
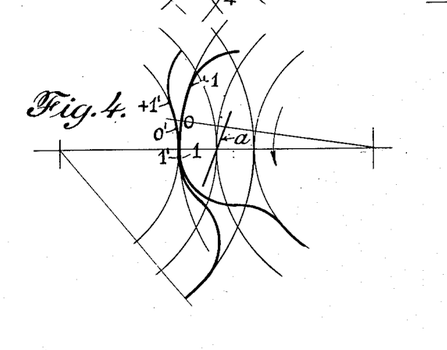

In Figs. 5, 6 and 7, the modification of the previous profile described in connection with Figs. 1 and 4, shows the limit proportions of the rolling profiles with maximum liquid seal when not in circular rolling or involute contact. This is attempted to be shown, for instance, in Figs. 5 and 6 where the connecting profiles 3, 4 and 3', 4' as well as the profiles I, 2, and I', 2', respectively, are shown to be the exact concave and convex complement of one another, thereby providing a definite linear seal.

It will be noted that in either type of profile, i. e., that shown in Figs. 1 to 4, or that shown in Figs. 5 to 7, there is no trapping of liquid between the mating gears. In the type of Figs. 5 to 7, the liquid escape between approaching mating profiles is perhaps somewhat more restricted than in the type of profile shown in Figs. 1 to 4. Under these circumstances, therefore, the latter type, i. e., the profile shown in Figs. 1 to 4, may be preferable for use in gear pumps utilized for more viscous liquids, whereas for gears utilized for pumping lighter liquids, the type of profile shown in Figs. 5 to 7 may be preferable because of the maximum linear seal provided thereby.

Figures 2, 3:
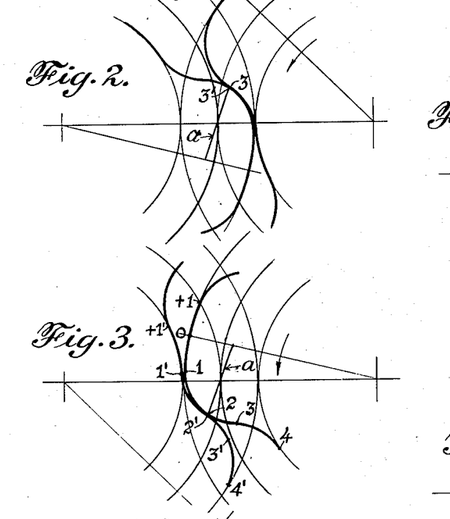

Coming now to just what position of the mating tooth profiles each of Figs. 1 to 7 illustrate, Fig. 1 shows the end of the circular seal at 4, 4'. The sealing contact rolls from 4, 4' towards 3, 3'. In Fig. 2 the rolling seal ends at 3, 3', the involute action starting at the same points. In Fig. 3 the involute action ends at 2, 2', and the rolling seal starts at said points 2, 2' and moves towards I, I'. In Fig. 4, the rolling seal ends at I, I', where the circular seal begins, continuing along points 0 and 0' and I, I' where such circular seal ends.

In Fig. 5 the circular seal ends at 4, 4', and the linear seal extends along the curve from 4, 4' to 3, 3', where the involute action starts. In Fig. 6 the involute action ends at 2, 2' and the linear seal is effective along the curve from 2, 2' to I, I'. Circular seal is then started at the point I, I'. In Fig. 7 the circular seal is effective at 0, 0'.

Figure 8:
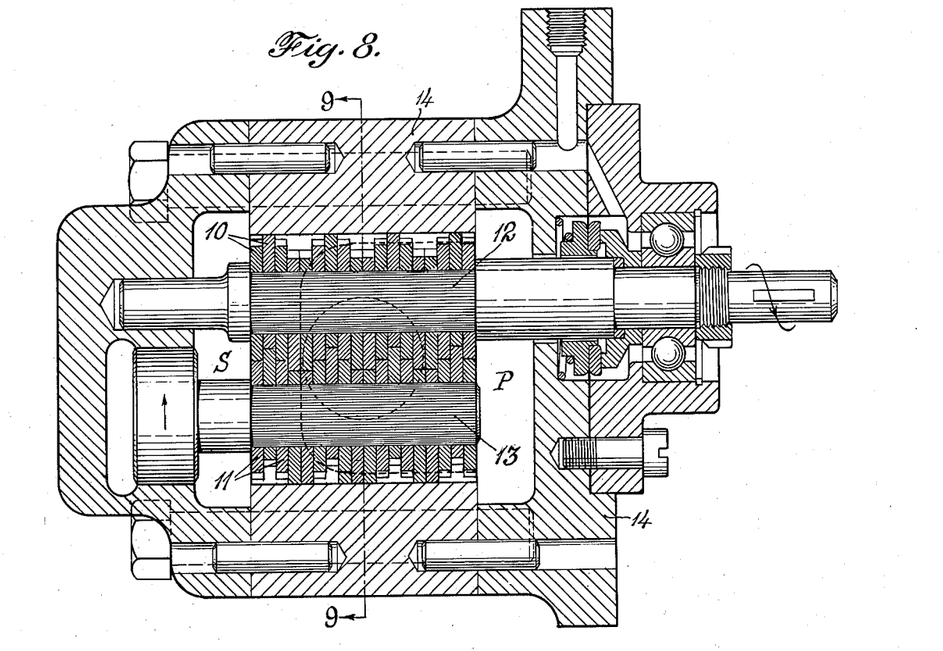
Fig. 8 is a section through an axial-flow rotary pump with two laminated rotors having teeth of the new type of profile.
Figure 9:
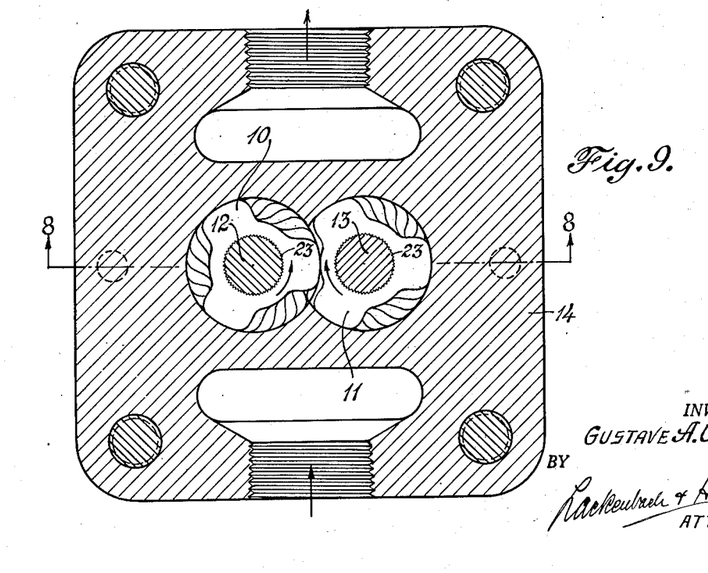
Fig. 9 is a section on the line 9—9 of Fig. 8.

Coming now to a description of actual commercial embodiments of my invention, as applied to various types of gear pumps, Figs. 8 and 9 illustrate the application of my novel tooth profile to an axial flow rotor pump in which the laminated rotors of the pump are provided with teeth having the new tooth profile.

In such Figs. 8 and 9, 10 designates the laminations of the driving rotor and 11 the laminations of the driven rotor. Both the driving and driven rotors are of the same size, comprising the laminations 10 and 11, each lamination having three teeth or lobes as shown in Fig. 9. The laminations are helically displaced against one another, the tips forming a helical driving rotor having a left-hand helix and the driven rotor a right-hand helix, each forming a triple thread. There is a sufficient number of laminations not only to provide always one or more laminations in driving involute engagement, but also to form a complete sealing separation between each end of the rotors. The theoretical minimum length is, therefore, one pitch or helical lead. To insure safe sealing separation of pressure and suction sides, several laminations are added to the theoretical minimum rotor length.

The profiles of the rotors are those illustrated either in Figs. 1 to 4 or those in Figs. 5 to 7 with continued sealing engagement at their peripheries and with driving involute portions.

It is believed unnecessary to describe in detail the construction of the axial flow rotary pump illustrated in Figs. 8 and 9. For the direction of rotation indicated, the suction side is designated by the letter S and the pressure or discharge side of the pump by the letter P. The driving rotor is mounted on drive shaft 12, and the driven rotor on shaft 13.

The rotary pump as illustrated shows means for hydraulically attaining an axial balance of the rotors which, however, as they are known to the art, are believed not necessary to be herein described. The entire pump is enclosed within a casing 14 of any conventional form.

Figure 10:
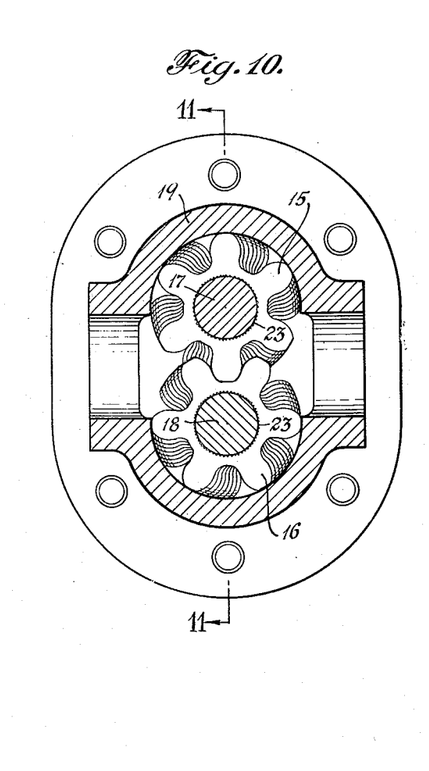
Fig. 10 is a vertical section on the line 10—10 of Fig. 11, showing a laminated gear pump with two helical rotors having teeth with the new tooth profile.
Figure 11:
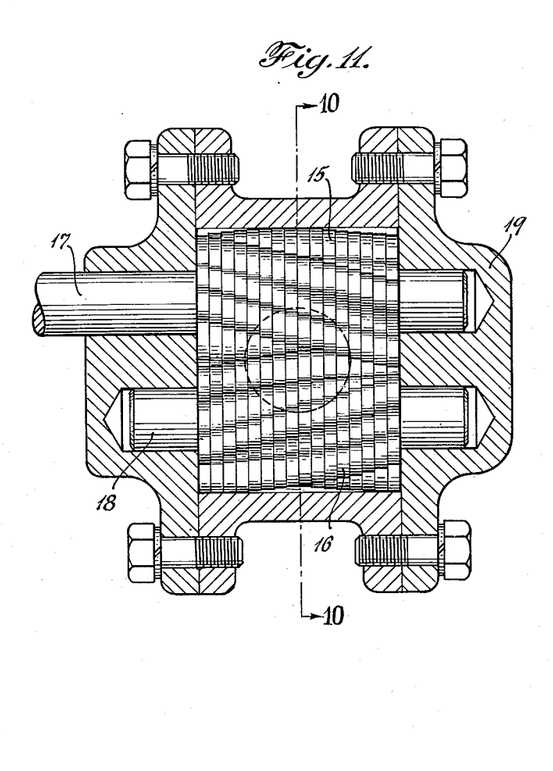

In Figs. 10 and 11, I illustrate the practical application of my new tooth profile to a laminated gear pump in which either the tooth profile of Figs. 1–4 or 5–7 can be used. To prevent leakage along the circumference, the angular extent of the circular tooth tip portion must be more than the angular displacement of adjacent laminations.

In the laminated gear pump of Figs. 10 and 11, the driving and driven gears are constituted of laminations 15 and 16, respectively, which are mounted upon their respective shafts 17 and 18, the pump being enclosed within a casing 19. As all other portions of the laminated gear pump illustrated in Figs. 10 and 11, with the exception of the new tooth profile, and the manner of mounting the laminations of each rotor upon their shafts, as hereinafter described, may be of conventional form, it is believed unnecessary to describe the general construction or the individual elements of such gear pump.

It will be noted that in Figs. 8 and 9 and Figs. 10 and 11, the laminations 10 and 11 and the laminations 15 and 16 are illustrated as secured to their respective shafts with circumferential serrations 23 indicated in the drawings. These serrations 23 are intended to indicate a preferred method of attaching the laminations to their shaft so as to form a solid unit without gaps between laminations and to insure torsional driving strength from shaft to rotors. Such preferred method, equally suitable for axial flow and radial types of laminated rotors, is one involving shrinking.

Briefly, the following procedure is preferably employed:

The laminations required for one rotor are assembled on an arbor and helically displaced by a suitable fixture. The laminations are then clamped in their correct positions by means of a keyed collar and a clamping unit. This arbor assembly is then inserted in a suitably configured clamping fixture wherein it is securely clamped by means of a keyed ring and a clamping unit, and the arbor thereafter removed.

The shaft to be applied to this rotor unit, having a diameter slightly larger than the lobes in the laminations has its outside surface provided with fine, sharp serrations. The shaft is preferably hardened to a sufficient depth to provide surface resistance and strength.

The serrated shaft is cooled to about 100° F. (f. i. in Dry Ice) and the laminations in their clamping fixture are heated to about 375° F. (or not higher than the drawing temperature of the steel used). The shaft is then rapidly inserted into the heated laminations, thereby shrinking the latter solidly onto the shaft. The sharp flutes of the serrations penetrate into the softer surfaces of the holes of the laminations, or where there is only a thin hard case, the shaft serrations break down this thin case and force it in waves into the soft surrounding metal. This produces a complete set of female serrations in the holes of the laminations and results in a permanent high tongue transmitting bond.

Figure 12:
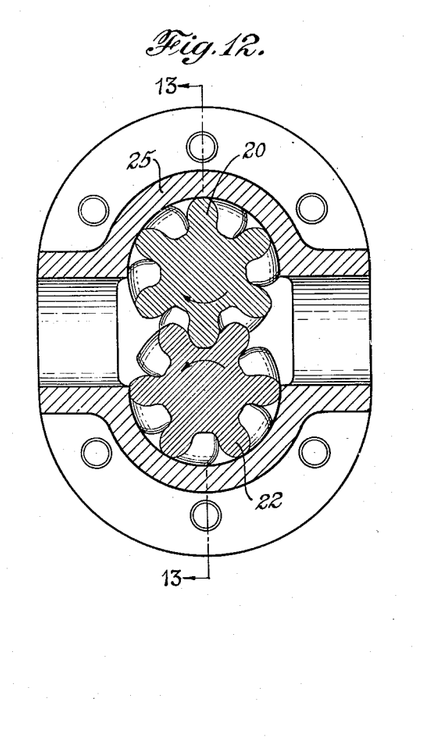
Figure 13:
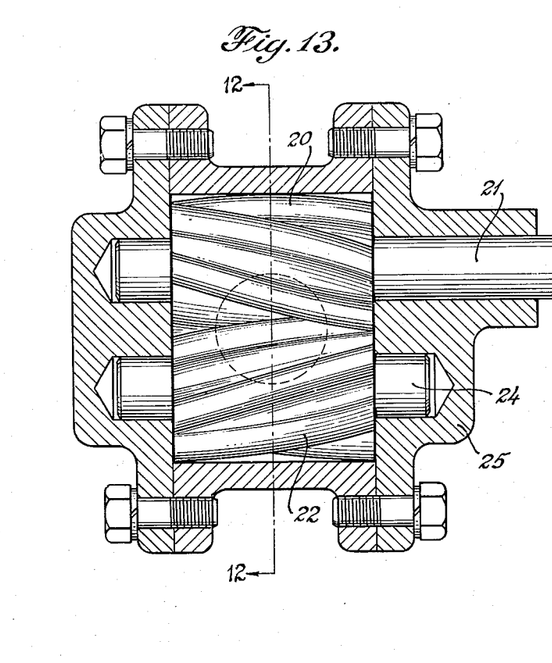
Fig. 13 is a section on the line 12—12 of Fig. 12.

In Figs. 12 and 13, I illustrate the application of my new profile gear teeth to a solid helical type of gear pump, in which the rotors and their shafts are in one piece, i. e., integral. In this case, both forms of tooth profile, i. e., that of Figs. 1 to 4 or Figs. 5 to 7 may be utilized. With both forms of the novel tooth profile, the necessary requirement of continuous involute driving engagement can be fulfilled by the rotors having a sufficient helical lead to produce involute driving contact in one or more sections taken at right angles to the rotor axes.

In Figs. 12 and 13, the driving gear 20 is formed as part of shaft 21 and the driven gear 22 is formed as part of shaft 24, the pump being enclosed in casing 25.

Figure 14:
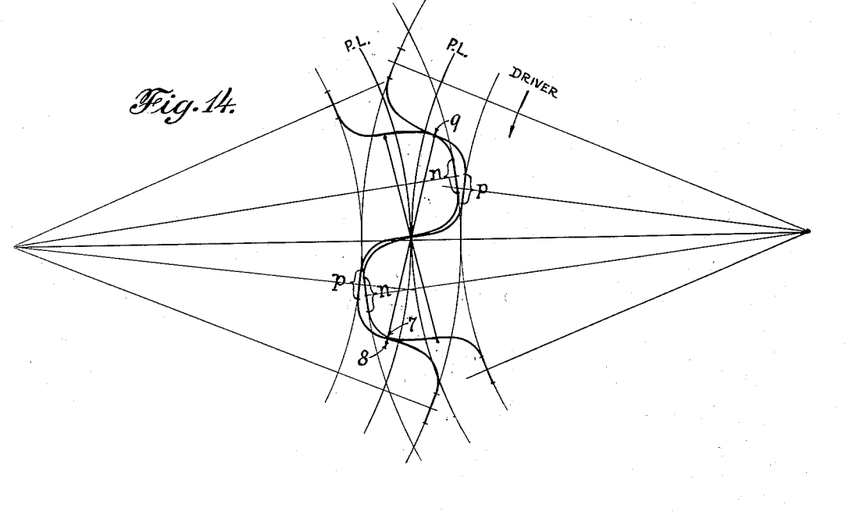
Fig. 14 illustrates schematically the involute driving engagement of the teeth of a non-residual spur type of gear pump.
Figure 15:
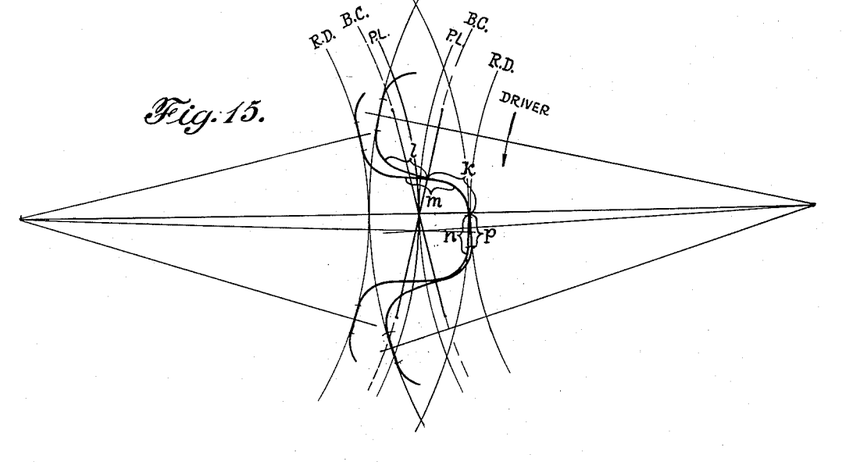
Fig. 15 shows the position of the meshing teeth of Fig. 14 in which the driving and driven profiles coincide within certain limits.

In Figs. 14 and 15 I have illustrated two positions of adjacent teeth, configured in accordance with my invention when applied to a non-residual spur type of gear pump. In Fig. 14 the driving gear is shown at the start of involute driving engagement of a tooth. The tooth tips or lands $n$ are again circular having the same curvature as the gear outside. The driving gear is shown at the right hand side of the figure, and the driven gear at the left hand side. The feature of the construction is that with a spur type of gear pump having, for instance, twelve teeth on each gear, there will always be at least one set of teeth in involute driving engagement.

As shown in Fig. 14, the driving gear is in involute driving engagement at points 9 and 7, the involute engagement ceasing at point 8 of line of action 9—8 with the following tooth of the driving gear having started the involute driving action at 9.

In the position of the teeth illustrated in Fig. 15, the driving and driven profiles coincide from the base circles B. C. to the root diameter R. D., i. e., in the portion marked $k$. In this manner all residual fluid is eliminated from between the separating teeth. The involute portions of the teeth are designated by the reference characters $l$ and $m$. Fig. 15, therefore, shows the position of adjacent teeth in which the driving and driven profiles coincide within certain limits as hereinabove explained. In this position the circular tip portion $n$ and the circular root portion $p$ of the root diameter R. D. have just completed their circular sealing travel.

Figure 16:
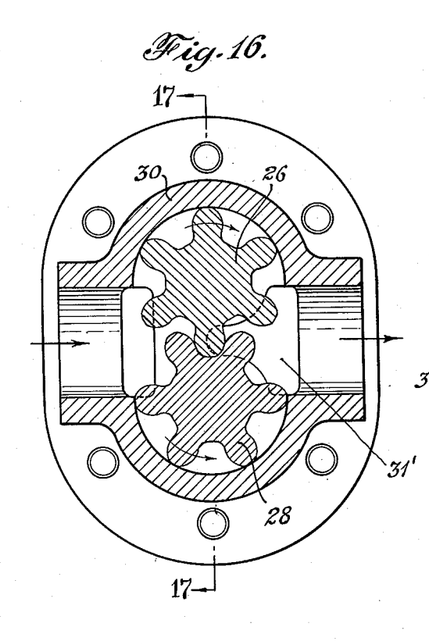
Fig. 16 shows a spur gear pump on a section 17—17 of Fig. 17, demonstrating that there are always at least two involute mating profiles in driving engagement on the line of action.
Figure 17:
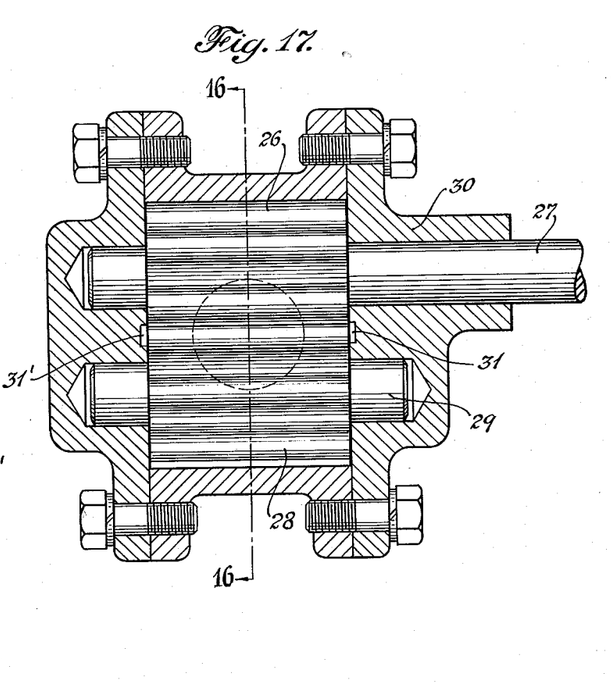
Fig. 17 is a section on the line 16—16 of Fig. 16.

In Figs. 16 and 17 I have illustrated the practical application of my novel tooth profile to a spur gear pump of otherwise conventional construction having the gear profiles illustrated in Figs. 14 and 15 with which there are always at least one pair of involute mating profiles in driving engagement on the line of action. In such figures the spur gear 26 which is the driving gear, is integral with shaft 27 and the spur gear 28, the driven gear, is integral with shaft 29 within the casing 30.

As with all spur gear types of pumps, provisions may be made for a relief for the liquid trapped between mating teeth (see Figs. 14 and 15) and such a relief is shown by the recesses 31 and 31' of Figs. 16 and 17 which, as known to the art, are required at the discharge port of the pump for the direction of rotation shown in Fig. 16.

While I have described and illustrated specific embodiments of my invention, it will be understood by those skilled in the art that the specific applications are given by way of example rather than by way of limitation. For instance, while I have shown and described my new tooth profile with involute driving portions, such driving portions may be cycloidal. Also, so long as the tooth profile of one gear when rotating the two gears on the same two velocities will be generated by the other with uninterrupted points of contact during the period of meshing or mating of the tooth, the requirements of my invention shall have been met.

I am aware that it has been heretofore suggested to configure a gear tooth profile with involute portions joined by circular curves or curves derived from a circular arc which join the straight-sided (generating) rack tangentially, but such form of tooth profile will not yield the results accomplished by my novel tooth profile. A tooth profile as suggested by the prior art is generated from a rack having crest and root formed of circular arcs or curves of similar form such as portions of an ellipse. The rack from which my novel tooth profile is generated has crest and root portions formed of straight lines joined tangentially by curved portions of any desired shape which will generate a mating gear profile with uninterrupted points of contact, the curve portions in turn joining the straight-sided inclined rack portion tangentially.

In the foregoing description it has been stated that pumps having rotors of the new gear type do not require timing gears since there is always driving engagement between the rotors.

It should be understood, however, that the use of timing gears is entirely feasible and it may be desirable under certain operating conditions. These may be, for instance, (a) pumping of hazardous liquids where actual metallic contact between rotors should be avoided and where the timing gears will provide operation of the pumping rotors with a slight but constant clearance, thereby providing an efficient liquid seal.

(b) pumping of gases at very high rotative speeds where actual rotor contact is not always desired and where sealing is maintained either through lubricant or solely by close clearances.

(c) hydraulic pumps operating against very high pressures (for instance over 1000 p. s. i.) where the use of timing gears will greatly add to the life of the rotors by reducing the high stresses between the tooth portions which do the driving.

While I have described and illustrated my novel tooth profile as applied to specific types of gear pumps, it is obvious that my invention is applicable to fluid pumps and motors generally, as well as to compressors. Also, while I have shown the specific application of my invention to external gear type rotors, obviously my novel tooth profile is equally applicable to internal gear type rotors of pumps, motors, and compressors.

I claim:

1. A pair of rotors for an external-tooth type of gear pump in which the tip of the individual tooth is constituted of a circular section of a diameter equal to the outside diameter of the rotor and of two curved sections adjacent said circular section, said adjacent curved sections being tangential at their point of juncture with a circular section of the tooth tip and being convex for both rotors, and in which the mating profiles of the two gears are partly convex involutes and partly convexly curved in their portion tangentially connecting with the outside diameter and partly concavely curved in their portion tangentially connecting with the root diameter, whereby the engagement in the meshing or mating zone is of an involute driving, as well as, of a rolling and line contact.

2. A tooth profile for the rotor of a rotary gear type pump, the tooth in each section perpendicular to the rotor axis, having a portion located in the ring area outside and inside the pitch diameter of an involute and a portion constituting the rest of the tooth profile of a convex curvature connecting the involute portion with the outside diameter, said convex curvature being substantially identical with the portion in each section connecting an involute portion with the root diameter, thereby permitting rotation without interference and with closest approach of the tips and bottoms of the tooth along a predetermined portion of the profile in a plane perpendicular to the rotor axis when the two rotors are not in driving engagement in such plane.

3. A tooth profile for the rotor of a rotary gear type pump which is configured in each section perpendicular to the rotor axis to have a portion located in the ring area outside and inside the pitch diameter with an involute curvature, the remaining portion of the tooth profile extending to the tip circle on one side and to the root circle on the other side, the radial distance of the tip circle of one tooth from its pitch circle being substantially equal to the radial distance of the root circle from the pitch circle of the mating tooth, thereby permitting rotation without interference and with closest approach of the tips and bottoms of the tooth along a predetermined portion of the profile in a plane perpendicular to the rotor axis when the two rotors are not in driving engagement.

4. A rotor for an external-tooth type gear pump in which the profiles of the individual teeth are constituted of driving portions on each side of the pitch line, said driving portions being of involute outline, a tip of rounded configuration comprising a circular section of a diameter equal to the outside diameter of the rotor, and two convex curved sections, the latter tangentially connecting the circular section with the involute driving portions, and the root of the tooth comprising a circular portion of a diameter equal to the root diameter of the rotor and two concave portions tangentially connecting the circular portions with the involute driving portion.

5. A rotor for an external tooth type gear pump in which the profiles of the individual teeth are constituted of driving portions on each side of the pitch line, said driving portions being of involute outline, a tip of rounded configuration comprising a circular section of a diameter equal to the outside diameter of the rotor, and two convex curved sections, the latter tangentially connecting the circular section with the involute driving portions, and the root section of the tooth being of a curvature generated by rotating a mating gear of the tip section described upon the root section at the same angular velocity.

6. A rotor as claimed in claim 5, in which the root section includes two concave portions tangentially connecting the circular portion thereof with its adjacent involute portions.

7. A rotor for an external tooth type gear pump in which the profiles of the individual teeth are constituted of driving portions on each side of the pitch line, said driving portions being of involute outline, the root section of the tooth comprising a circular portion of a diameter equal to the root diameter of the rotor, and a tip section of rounded configuration having a curvature generated by rotating a mating gear of the root section described upon the tip section at the same angular velocity.

8. A rotor as claimed in claim 7, in which the root section includes two concave portions tangentially connecting the circular portion thereof with its adjacent involute portion.

9. A rotor as claimed in claim 7, in which the tip section includes two convex curved portions tangentially connecting the circular portion of the tip section with its adjacent involute driving portions.

10. A tooth for an external-tooth type gear having a profile constituted of driving portions, on each side of the pitch line, of involute outline, and a tip of rounded configuration comprising a circular section and two convex curved sections, the latter tangentially connecting the circular section with the involute driving portions.

11. A tooth for an external-tooth type gear, having a profile constituted of driving portions on each side of the pitch line, of involute outline, a tip of rounded configuration and a root comprising a circular portion and two concave portions tangentially connecting the circular portion with its adjacent involute portion.

12. A tooth for an external-tooth type gear, having a profile constituted of driving portions on each side of the pitch line of involute outline, a tip of rounded configuration, of a diameter equal to the outside diameter of the rotor and a root comprising a circular portion and two concave portions tangentially connecting the circular portion with its adjacent involute portion.

13. A tooth for the rotor of gear type pumps, having a profile in a plane perpendicular to the rotor axis, comprising driving portions, outside and inside the pitch line, of involute outline, a tip of curved configuration comprising a circular portion of a diameter equal to the tip diameter of the rotor and two convex portions, the latter tangentially connecting the circular tip portion with the involute driving portions, and a root of curved configuration, comprising a circular portion of a diameter equal to the root diameter of the rotor and two concave portions, the latter tangentially connecting the circular root portions with the involute driving portions.

GUSTAVE A. UNGAR.

REFERENCES CITED

The following references are of record in the file of this patent:

UNITED STATES PATENTS

| Number | Name | Date |
|---|---|---|
| 1,434,987 | Bastock et al. | Nov. 7, 1922 |
| 1,828,114 | Hubbard | Oct. 20, 1931 |
| 2,321,696 | Montelius | June 15, 1943 |

FOREIGN PATENTS

| Number | Country | Date |
|---|---|---|
| 8,084 | Great Britain | 1896 |
| 425,689 | Germany | Feb. 22, 1926 |
| 382,953 | Great Britain | Nov. 10, 1932 |
| 103,701 | Australia | Apr. 8, 1938 |